US011871829B2

(12) United States Patent
Noda

(10) Patent No.: US 11,871,829 B2
(45) Date of Patent: Jan. 16, 2024

(54) COSMETIC CONTAINER WITH A HEAD-MASSAGE FUNCTION

(71) Applicant: P.G.C.D. JAPAN, Inc., Tokyo (JP)

(72) Inventor: Taihei Noda, Tokyo (JP)

(73) Assignee: P.G.C.D. Japan Inc., Tokyo (JP)

( * ) Notice: Subject to any disclaimer, the term of this patent is extended or adjusted under 35 U.S.C. 154(b) by 766 days.

(21) Appl. No.: 16/469,707

(22) PCT Filed: Nov. 29, 2018

(86) PCT No.: PCT/JP2018/044095
§ 371 (c)(1),
(2) Date: Oct. 13, 2020

(87) PCT Pub. No.: WO2019/167369
PCT Pub. Date: Sep. 6, 2019

(65) Prior Publication Data

US 2021/0330053 A1 Oct. 28, 2021

(30) Foreign Application Priority Data

Feb. 27, 2018 (JP) ................................ 2018-033222

(51) Int. Cl.
*A45D 24/22* (2006.01)
*A45D 24/26* (2006.01)
(Continued)

(52) U.S. Cl.
CPC ............ *A45D 24/26* (2013.01); *A45D 34/04* (2013.01); *A61H 7/003* (2013.01);
(Continued)

(58) Field of Classification Search
CPC ...... A45D 19/026; A45D 24/22; A45D 24/24; A45D 24/26; A45D 34/04;
(Continued)

(56) References Cited

U.S. PATENT DOCUMENTS 1,113,843 A * 10/1914 Smith .................. A45D 19/026
401/185
1,540,863 A * 6/1925 Richardson ............ A61H 7/003
132/212

(Continued)

FOREIGN PATENT DOCUMENTS

JP S5820603 2/1983
JP 2004329440 11/2004

*Primary Examiner* — Rachel R Steitz
(74) *Attorney, Agent, or Firm* — Blueshift IP LLC; Robert Plotkin

(57) ABSTRACT

There is provided a cosmetic container that includes a head-massage function and that includes: a refill for containing a cosmetic liquid, a head-contact part that is attached to the refill, and that includes multiple projections, wherein the projections are arranged in one or more rows so that the projections disposed on the periphery of the head-contact part are higher than those disposed in the center of the head-contact part so that the projections form a curved shape, a case that detachably accommodates the refill inside the case, the case being slightly flattened in one direction in a plan view to form a jellyfish shape so as to enable the case's side to be gripped, an inner cap that accommodates the multiple projections so as to protect them, so that the inner cap prevents the cosmetic liquid from leaking out of the projections, a cap that accommodates the head-contact part and the inner cap so as to protect them, so that the cap holds in an upright state the refill, the head-contact part, and the case; and a through-hole provided to each of the multiple projections in the axial center of the through-hole, so that the through-hole serves as a supply path of the cosmetic liquid. The refill is changed according to a user's grasping power if the user holds the case with power equal to or more than a fixed level, whereby the cosmetic liquid is supplied in an amount according to the change of the refill from each tip of the projections.

4 Claims, 4 Drawing Sheets

(51) Int. Cl.
*A45D 34/04* (2006.01)
*A61H 7/00* (2006.01)
*A45D 34/00* (2006.01)

(52) U.S. Cl.
CPC .................. *A45D 2034/005* (2013.01); *A61H 2201/105* (2013.01); *A61H 2205/021* (2013.01)

(58) Field of Classification Search
CPC ............ A45D 2034/005; A61H 7/0073; A61H 2201/105; A61H 2205/021
See application file for complete search history.

(56) References Cited

U.S. PATENT DOCUMENTS

| | | | | |
|---|---|---|---|---|
| 6,260,557 | B1 * | 7/2001 | Yarbrough ............. | A45D 24/22<br>132/114 |
| 6,505,986 | B1 * | 1/2003 | Oder ...................... | A45D 24/26<br>222/211 |
| 2004/0035435 | A1 * | 2/2004 | Glucksman ............ | A45D 24/28<br>132/114 |
| 2005/0257800 | A1 * | 11/2005 | Inoue ..................... | A45D 24/26<br>132/137 |
| 2009/0320868 | A1 * | 12/2009 | Wang ..................... | A45D 24/26<br>132/112 |

* cited by examiner 10
20
50
42
70
80

10
20
50
40
42
70
80
I
I'
41

10
1
80

75

COSMETIC CONTAINER WITH A HEAD-MASSAGE FUNCTION

TECHNICAL FIELD

The present invention relates to a cosmetic container that includes a head-massage function (hereinafter "cosmetic container that includes a head-massage" is "present invention"). In particular, the invention relates to a cosmetic container that enables a user, by holding the container with a grasping power that is equal to or greater than a fixed level that is needed to supply a desired amount of a cosmetic liquid while the user is massaging the head using the container, to supply the desired amount of the cosmetic liquid.

BACKGROUND ART

Many people have problems regarding their hair, including hair loss and thinning hair, and/or regarding the scalp, including dandruff and itching. Various massage techniques and massage devices have been developed to improve blood circulation in the scalp to prevent hair loss and to improve the scalp's condition. Prior-art massaging tools are generally configured in such a way that the base of a tool is provided with multiple projections that are to be used for massaging the scalp. The user holds the base of the tool while pressing the protrusions against the head so that the protrusions stimulate the head and massages the head by moving the base along the scalp while the protrusions are pressed against the scalp.

There also are a wide variety of agents for curing hair-related problems, including hair-restorers for promoting hair growth by supplying nutrients and providing appropriate stimuli to the scalp and applying a cosmetic liquid for conditioning the scalp. These hair-restorers or cosmetic liquids are generally sprinkled over or directly applied to the scalp, and they are considered effective in solving hair-related problems while simultaneously providing a cosmetic liquid, such as a hair-restorer, to the scalp and massaging the scalp. However, after a user applies a cosmetic liquid to the entire scalp, the massaging tool tends to slip out of the user's hands, and also the user feels uncomfortable about holding the massaging tool due to the liquid remaining on the user's hands. Therefore, the user must wash his or her hands before holding the massaging tool, whereby there has been a problem that the user feels inconvenienced when using both the cosmetic liquid and the massaging kit at the same time. In order to address this problem, a massaging device, or a liquid container that includes a head-massage function that enables a user to massage the scalp while a hairdressing or hair-restorer is being supplied to the scalp also has been developed.

Patent Document 1 discloses a liquid container for containing a hairdressing, a hair-raising agent, or the like, in which multiple projections are provided on a part of the container, and small holes are provided near the projections or to each of the projections, whereby the liquid inside the container is taken out through each of the holes. Because of this configuration, the liquid container can supply a liquid to the scalp while providing stimuli due to the projections to the portion of the head where the liquid is applied.

Patent Document 2 discloses a massage device that includes (1) multiple cylindrical massage projections having rounded tips for massaging the scalp by pressing the fascia of a person's head, (2) an installation unit into which the massage projections are installed, and (3) a storage portion provided to the installation unit for containing a liquid. At least one of the massage projections is provided with a through-hole that communicates with the storage portion, whereby the device can be used for massaging the scalp while the liquid is supplied through the through-hole.

The inventions disclosed in Patent Documents 1 and 2 allow a user to massage the scalp while supplying a liquid required for the massage, whereby the user effectively massages the scalp without wetting his or her hands with the liquid. However, the inventions of both Patent Documents 1 and 2 have a problem that adjusting the amount of the liquid to be supplied is not easy, for the following reasons. In the invention of Patent Document 1, the supply of liquid is performed by capillary action along the hairs that are in contact with each of the small holes. In the massage device of the invention of Patent Document 2, the amount of the liquid to be supplied is adjusted by varying the number of the projections to which through-holes are provided and those to which through-holes are not provided. Therefore, there is a need for a massage device or a liquid container that includes a head-massage function that enables a user to easily use the device or container in such a way that if a liquid is to be supplied, the liquid can be supplied regardless of whether the scalp is being massaged, or if the liquid is not to be supplied, the scalp can be massaged without supplying the liquid.

PRIOR-ART DOCUMENTS

Patent Documents

Patent Document 1: Japanese Unexamined Utility Model (Registration) Application Publication No. 58-20603.
Patent Document 2: Japanese Unexamined Patent Application Publication No. 2004-329440.

SUMMARY OF THE INVENTION

Technical Problem to be Overcome

The present invention has been made to solve the problem of the above-described conventional cosmetic containers that are provided with a head-massage function. One objective of the present invention is to provide a cosmetic container that enables a user, by holding the container with a grasping power that is equal to or greater than a fixed level that is needed to supply a desired amount of a cosmetic liquid while the user is massaging the head using the container, to supply a desired amount of the cosmetic liquid.

Solution to the Problem

A cosmetic container that includes a head-massage function according to the present invention provides the features specified below, which are provided to achieve the aforementioned objective. The cosmetic container that includes a head-massage function includes (1) a refill for containing a cosmetic liquid inside the container, (2) a head-contact part, that is attached to the refill, and that includes multiple projections that are arranged in one or more rows so that the projections disposed on the periphery of the head-contact part are higher than those disposed in the center of the head-contact part, so that the projections form a curved shape, (3) a case that detachably accommodates the refill inside the case, the case being slightly flattened in one direction in a plan view to form a jellyfish shape so as to enable the case's side to be gripped, (4) an inner cap that accommodates the multiple projections so as to protect them, so that the inner cap prevents the cosmetic liquid from leaking out of the projections, (5) a cap that accommodates the head-contact part and the inner cap so as to protect them, so that the cap holds in an upright state the refill, the head-contact part, and the case; and (6) a through-hole provided to each of the multiple projections in the axial center of the through-hole, so that the through-hole serves as a path for supplying the cosmetic liquid. The refill is changed according to a user's grasping power if the user holds the case with a strength equal to or more than a fixed level, whereby the cosmetic liquid is supplied in an amount according to the change of the shape of the refill from each tip of the multiple projections. The refill and the head-contact part integrally form a cosmetic-liquid supply structure, and a refill container is formed by fitting the inner cap into the cosmetic-liquid supply structure, so that the refill container is used for refilling the cosmetic liquid into the cosmetic container that includes a head-massage function.

It is preferable that both the case and the refill are composed of a flexible material, and that there is a space between the refill and the case. In the state where the case is only gently grasped by a user, only the case is changed to fit the user's hand, and by applying to the case strength equal to or more than the level by which the case is changed to the extent that the case contacts the refill, the refill is changed, and the cosmetic liquid is supplied. It is preferable that the cosmetic container that includes a head-massage function further includes a dedicated adapter for massaging the scalp. The dedicated adapter is configured to be detachable from the head-contact part, and it is composed of a material that is more flexible than the projections of the head-contact part. The dedicated adapter includes multiple protruding storage portions whose number accords with that of the multiple projections, and each tip of the multiple storage portions is configured to be round and includes a through-hole at the center of the tip, so that the through-hole is communicated with each of the through-holes of the projections.

Advantageous Effects of the Invention

In the cosmetic container that includes a head-massage function according to the present invention, the user can apply a force to the case of the container by gripping it to apply the force to the refill inside, by which the shape of the refill containing a cosmetic liquid such as a hair-restorer is changed. This enables the cosmetic liquid to be supplied from each tip of the projections that are operative for massaging the scalp, whereby the user can supply a desired amount of the cosmetic liquid to the scalp to be massaged while the user is massaging the head by using the cosmetic container. Because there is a space between the refill and the case, in the state where the case is just gently grasped by the user, the refill is not changed, but only the shape of the case is changed. In that state, the cosmetic liquid is not supplied, and therefore the user can choose to only massage the scalp without supplying the cosmetic liquid.

In the cosmetic container that includes a head-massage function according to the present invention, the inner cap prevents the cosmetic liquid from leaking out of the projections, and the cap, which also serves as a stand, holds the container in an upright position so that the holding part of the container is positioned on the container's upper side. Therefore, the user can use the container without passing it from one hand to the other hand, which increases the user-friendliness of the cosmetic container. In the cosmetic container of the present invention, refilling the cosmetic liquid into the cosmetic container after the cosmetic liquid has been used up is performed by replacing the supply structure, which is composed of a refill and a head-contact part, with a new cosmetic-liquid supply structure, so as to avoid (1) the risk of clogging of the cosmetic-liquid supply path of the cosmetic liquid, and (2) the risk of the cosmetic-liquid leaking from the container while refilling the container. In the cosmetic container of the present invention, it is possible to attach to the projections an inner cap or a dedicated adapter for massaging the scalp that is more flexible than the projections, to massage the scalp, and therefore the user can selectively use the part that is applied to the scalp according to the condition of the scalp.

BRIEF DESCRIPTIONS OF THE DRAWINGS

FIG. 1 schematically shows the overall structure of the present invention's cosmetic according to the first embodiment.

FIG. 1(*b*) is a front view showing the main components of a cosmetic container with a head-massage function according to an embodiment of the present invention.

FIG. 1(*c*) is a side view of each of the components in FIG. 1(*b*).

FIG. 1(*d*) is a front view of a dedicated adapter for a cosmetic container with a head-massage function according to an embodiment of the present invention.

FIG. 2(*a*) is a front view of a cosmetic liquid supply structure including a refill of a cosmetic container with a head-massage function according to an embodiment of the present invention.

FIG. 2(*b*) is a side view of FIG. 2(*a*).

Figure 4:
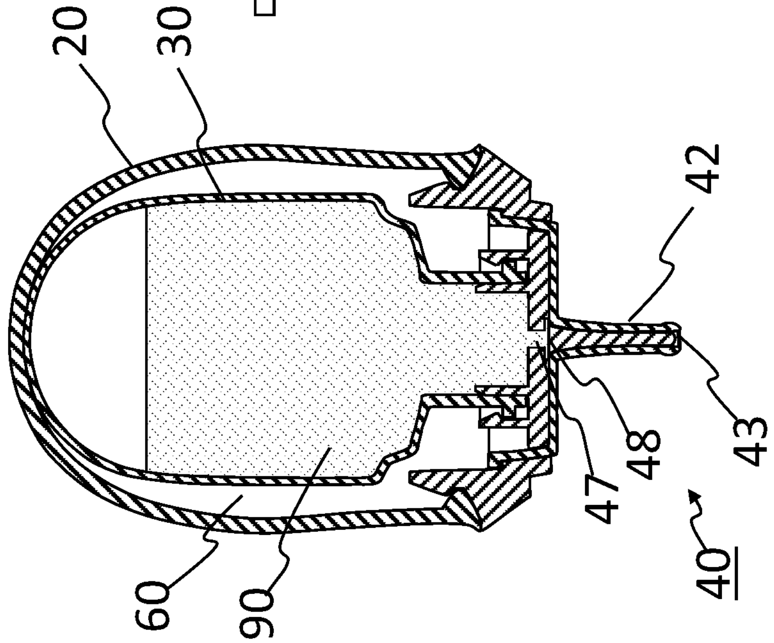
Figure 4:
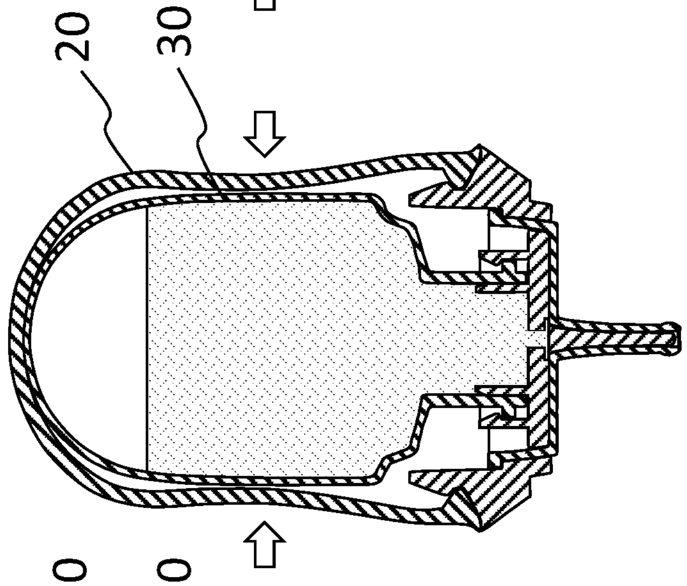
Figure 4:
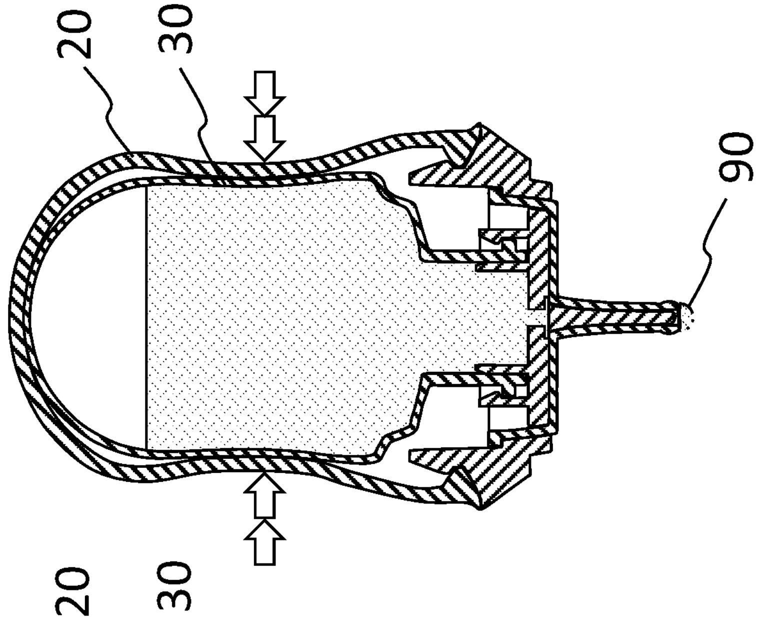

FIG. 4 schematically shows how a cosmetic liquid is supplied to the cosmetic container that includes a head-massage function according to the first embodiment of the present invention.

FIG. 4(*a*) is a diagram showing a state in which no external force is applied to a cosmetic container with a head-massage function according to an embodiment of the present invention.

FIG. 4(*b*) is a diagram showing a state in which a cosmetic container with a head-massage function is held by a user with a grasping power less than a fixed level.

FIG. 4(*c*) is a diagram showing a state in which a cosmetic container with a head-massage function is held by a user with a grasping power of equal to or more than a fixed level.

DESCRIPTIONS OF EMBODIMENTS

Figures 1, 1A, 1D:
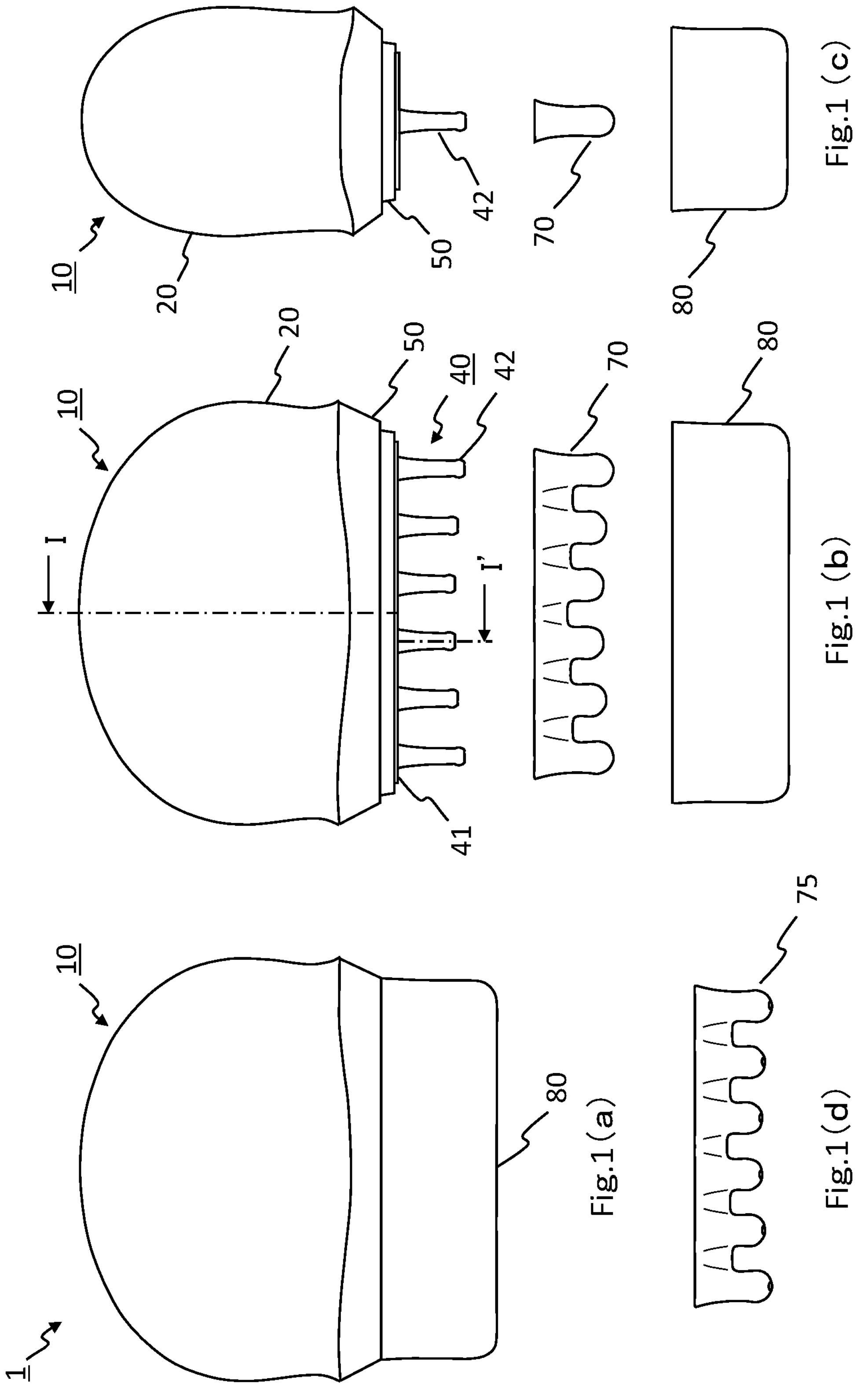
FIG. 1(*a*) is a drawing showing the entire contour of a cosmetic container with a head-massage function according to an embodiment of the present invention.

Next, specific embodiments of the present invention's cosmetic container will be described in detail with reference to the drawings. FIG. 1(*a*) to FIG. 1(*c*) is a are drawings that schematically shows the overall structure of the present invention's cosmetic container according to the first embodiment of the present invention. FIG. 1(*a*) is a drawing that shows the entire contour of the cosmetic container, FIG. 1(*b*)

is a front view that shows the main components of the container, and FIG. 1(*c*) is a side view of each of the components in FIG. 1(*b*).

FIG. 1(*a*) to FIG. 1(*c*) shows the present invention's cosmetic container according to the first embodiment of the present invention, which includes a main body 10 and a cap 80. The main body 10 of the cosmetic container includes (1) a head-massage function 1 that includes a case 20 that also serves as a holding part, (2) a head-contact part 40 that is provided with projections 42 for massaging the scalp, and (3) a base ring 50 that connects the case 20 with the head-contact part 40. The cosmetic container that includes a head-massage function 1 further includes an inner cap 70 that covers the projections 42.

The present invention's cosmetic container is provided with projections 42 for massaging the scalp, which are arranged in one or more rows, and that allow a user to massage the scalp with one hand like combing one's hair. The cosmetic container that includes a head-massage function 1 houses a flexible container that contains a cosmetic liquid and that is provided with a supply path that communicates the mouth of the container to a through-hole provided to each of the projections 42 for massaging the scalp. When the user grips the holding part with a force above a certain level, the shape of the flexible container is changed according to the amount of force that is applied, and the cosmetic liquid inside the container is supplied to the scalp through the supply path and from the tip of each projection for massaging the scalp. Therefore, in accordance with the user's desire to utilize the cosmetic liquid, the present invention's cosmetic container that includes a head-massage function that allows the user to massage the scalp while the cosmetic liquid is being supplied to the scalp. That is, the present invention's cosmetic container that includes a head-massage function 1 enables the user to select whether or not the cosmetic liquid is to be supplied to the scalp, and to adjust the amount of the cosmetic liquid to be supplied, in accordance with the user's gripping force.

As shown in FIG. 1(*b*) especially in and FIG. 1(*c*), the case 20 of the main body 10 is configured to be slightly flattened in one direction in a plan view so as to form a jellyfish shape, so that the user can grip the side of the case 20. As will be described later with reference to FIG. 3, a cavity is provided inside the case 20 so as to house the refill that contains the cosmetic liquid. The case 20 is also made of a flexible material so that the shape of the refill to be housed in the case 20 can be changed by the user's gripping force when the user grasps the case 20. An elastomer such as a thermoplastic resin material can be used as the flexible material for the case 20, and in particular it is preferable to use a material that is easy to grip and easy to fit in the user's hands. The case 20 is detachably combined with the base ring 50 so as to provide the external form of the main body 10. To permit the connection between the case 20 and the base ring 50, a convex engagement portion is formed at the lower end of the inner circumference of the case 20, so as to engage with the concave engagement portion provided at the upper portion of the outer periphery of the base ring 50.

The head-contact part 40 includes a head-contact-part case 41 and multiple projections 42 for massaging the scalp. The head-contact part 40 is made of a resin material, and the multiple projections 42 for massaging the scalp are integrally formed with the head-contact-part case 41 so as to protrude therefrom. As described later with reference to FIG. 3, the head-contact part 40 has a recessed part at the side opposite to the projections 42, the recessed part accommodating a head-contact-part-joint member that is combined with the head-contact-part case 41 so as to form a channel though which the cosmetic liquid is supplied.

The multiple projections 42 for massaging the scalp are arranged in one or more rows that form a curved shape such that each tip of the projections 42 fits the shape of the head so as to effectively massage the scalp. That is, the projections 42 are configured such that the projections 42 disposed on the periphery of the head-contact part 40 are higher than those disposed in the center of the head-contact part 40, so that the multiple projections 42 uniformly contact the scalp when applied to the scalp. Each of the projections 42 is tapered from the head-contact-part case 41 toward the tip of the projections 42, with each tip rounded to have a bulging shape so that the contact of the tip with the scalp is softened. Each of the projections 42 is provided, in its axial center, with a through-hole through which the cosmetic liquid is supplied.

In the head-contact part 40 of FIG. 1(*b*) and FIG. 1(*c*), the projections 42, which consist of six protrusions, are arranged in one row, but the number of the protrusions forming the projections 42 is not limited to six, and may be more or less than six. The projections 42 may be arranged in multiple rows and not limited to one row. The projections 42 in multiple rows may be arranged in a grid pattern, but preferably are arranged in a zigzag pattern. Regardless of the number and/or the rows in the arrangement of the projections 42, each tip of the projections 42 is arranged to form a curved shape so as to uniformly contact the scalp.

The base ring 50 connects the case 20 with the head-contact part 40, is configured to be ring-shaped, and into which the head-contact part 40 is inserted. The base ring 50 supports the head-contact part 40 so that the lower-end face of the head-contact-part case 41 and the projections 42 are exposed to the bottom of the cosmetic container that includes a head-massage function 1. The base ring 50 is provided with a concave engagement portion at the upper portion of the outer periphery of the base ring 50 so that the concave portion engages with the case 20 that is put to cover the base ring 50. Further, at the lower end of the base ring 50, a stepped portion having an external shape corresponding to the inner periphery of the cap 80 is provided so that the base ring 50 is fitted to the cap 80. A projection corresponding to the stepped portion of the base ring 50 may be provided to the upper inner periphery of the cap 80 so that the projection can interlock with the stepped portion, by which the cap 80 is prevented from slipping off the base ring 50.

The inner cap 70 accommodates the projections 42 so as to protect them, whereby the inner cap 70 prevents the cosmetic liquid from leaking out of the projections 42. The inner cap 70 may be configured to have a single storage space for storing the protrusions 42 together in the space so as to protect the protrusions 42. However, to prevent the cosmetic liquid from leaking out of the projections 42, the inner cap 70 is preferably provided with multiple storage portions whose number is in accord with that of the projections 42, whereby each of the storage portions can cover each protrusion of the projections 42. A resin material is used for the inner cap 70, and in particular a soft material such as rubber is preferably used, so as to enhance the adhesion of the inner cap 70 to the projections 42 so as to effectively prevent the leakage of the cosmetic liquid therefrom.

The inner cap 70 is configured to use material that is more flexible than that of the projections 42, and to have protruding portions, each of which can cover one of the protrusions of the projections 42, as shown in FIG. 1(*b*) and FIG. 1(*c*), so that the user can massage the scalp with the cosmetic container that includes a head-massage function 1 in a state where the inner cap 70 is attached to the projections 42. In this case, the user can massage the scalp via the inner cap 70 whose material is more flexible than that of the projections 42 instead of massaging the scalp with the projections 42. Accordingly, the user can selectively use the part of the cosmetic container that includes a head-massage function 1 that contacts the scalp as desired.

Also, a dedicated adapter 75 for massaging the scalp (not shown) shown in FIG. 1(*d*) may be used in addition to the inner cap 70. The dedicated adapter 75, like the inner cap 70, preferably uses material that is more flexible than that of the projections 42, to have substantially the same shape as that of the inner cap 70, to form each tip of the storage portions that accommodate each of the protrusions of the projections 42 in a rounded shape, and to have, at the center of the tip, a through-hole that is communicated with each through-hole of the projections 42 to supply the cosmetic liquid to the scalp. A user whose scalp is sensitive can massage the scalp using the dedicated adapter 75 by attaching the dedicated adapter 75 to the projections 42 more softly than when massaging the scalp using the projections 42, and can supply the cosmetic liquid to the scalp through each through-hole provided at each tip of the storage portions of the dedicated adaptor 75 while massaging the scalp. In another embodiment, several dedicated adaptors 75 may be provided in a replaceable manner, by which the hardness and the round shape of the tip in contact with the scalp can be varied. When a dedicated adapter 75 for massaging the scalp has been used, the cosmetic container that includes a head-massage function 1 is accommodated in the cap 80 after the use of the dedicated adapter 75. In such a case, the dedicated adapter 75 is replaced by the inner cap 70 before placing the cosmetic container that includes a head-massage function 1 in the cap 80 so that the cosmetic liquid is prevented from leaking from the projections 42.

The cap 80 accommodates the head-contact part 40 and the inner cap 70 to protect them, and holds in an upright state the main body 10, i.e., the case 20 to which the head-contact part 40 is attached. The cap 80 also serves as a stand and holds the case 20, or the holding part, in an upright position as shown in FIG. 1(*a*) to FIG. 1(*c*), so that the user can pick up the main body 10 by holding down the cap 80, and can continue to hold the main body 10 without passing the main body 10 from one hand to the other hand.

Figure 2:
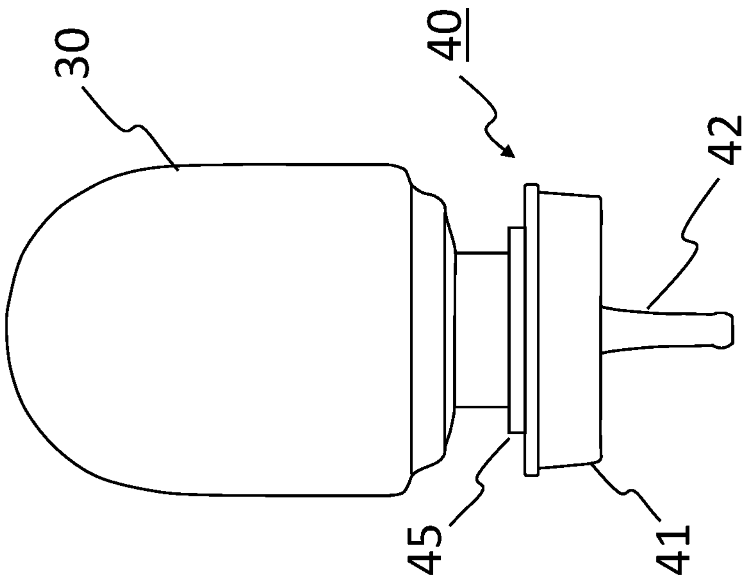
FIG. 2 is a drawing that schematically shows the cosmetic-liquid supply structure of the cosmetic container that includes a head-massage function, including a refill and a head-contact part according to the first embodiment of the present invention.
Figure 2:
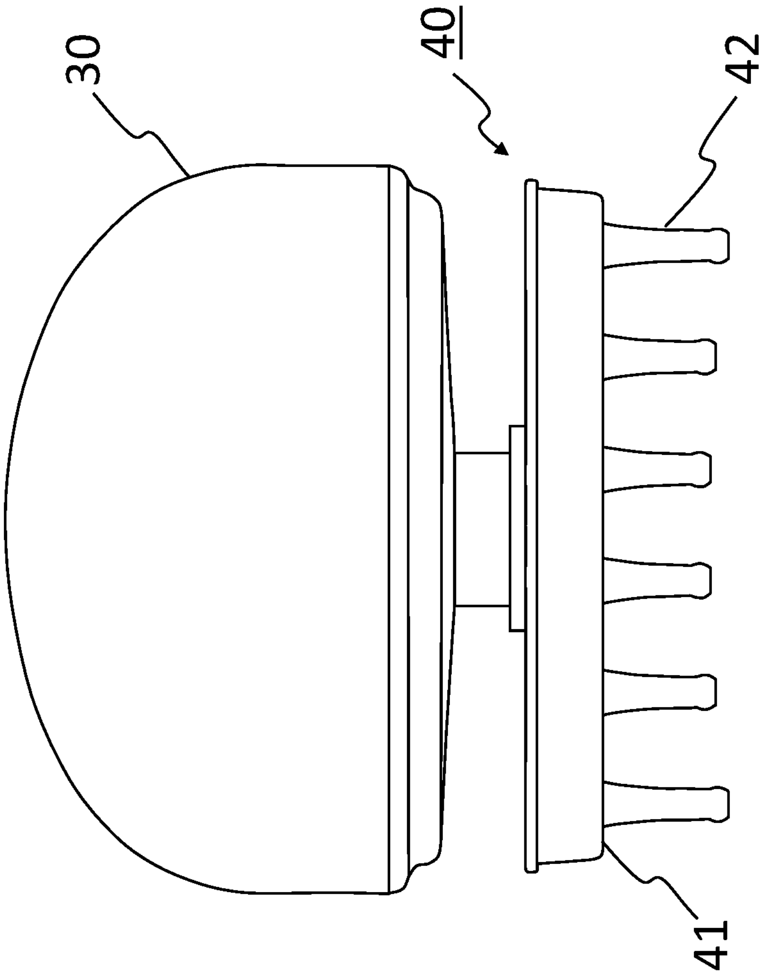

FIG. 2(*a*) and FIG. 2(*b*) is a are drawings that schematically shows the cosmetic-liquid supply structure of the cosmetic container that includes a head-massage function 1 according to the first embodiment of the present invention. FIG. 2(*a*) is a front view of the cosmetic-liquid supply structure, and FIG. 2(*b*) is a side view thereof in FIG. 2(*a*). FIG. 2(*a*) and FIG. 2(*b*) shows that the cosmetic-liquid supply structure includes a refill 30 and a head-contact part 40.

The refill 30 is a case that in a plan view is configured to have a slightly flattened shape in one direction so that the refill 30 is accommodated in the internal cavity of the case 20. A mouth portion, configured in a substantially cylindrical shape, through which the cosmetic liquid enters and goes out from the case, protrudes from the refill, and engages with the head-contact part 40. As shown by FIG. 1(*a*) to FIG. 1(*c*), in the state where the cosmetic container that includes a head-massage function 1 is maintained while the cap 80 is attached to the body 10, the cosmetic container that includes a head-massage function 1 is held so that the head-contact part 40 faces downward. Accordingly, as is shown in FIGS. 2(*a*) and 2(*b*), the refill 30 is held in an inverted manner in which the mouth portion faces downward. Therefore, a refill attachment portion 45, which has a double cylindrical wall, is attached to the head-contact part 40 so that the cosmetic liquid cannot leak out from the boundary between the head-contact part 40 and the mouth portion of the refill 30. The mouth portion of the refill 30 is attached to the refill attachment portion 45 so as to snugly fit in the double cylindrical wall. In this first embodiment, a refill container is formed by fitting the inner cap 70 into the cosmetic-liquid supply structure shown in FIG. 2(*a*) and FIG. 2(*b*).

Refilling of a cosmetic liquid is usually performed by transferring the cosmetic liquid from a container for distribution to a container like the refill 30. However, in this first embodiment of the present invention, the cosmetic liquid is refilled by replacing an existing cosmetic-liquid supply structure that includes the refill 30 and the head-contact part 40 shown in FIG. 2(*a*) and FIG. 2(*b*) with a new cosmetic-liquid supply structure that includes the refill 30 and the head-contact part 40. This avoids both the risk of clogging of the cosmetic-liquid supply path due to long-term use, and the risk of the cosmetic liquid for refill being spilled while being transferred to the container. In this first embodiment, the user can easily refill the cosmetic liquid by performing the steps including removing the case 20 from the base ring 50, taking out the used-up cosmetic-liquid supply structure composed of the refill 30 and the head-contact part 40 from the case 20, placing a new cosmetic-liquid supply structure in the base ring 50, and fitting the case 20 into the base ring 50 from above.

Figure 3:
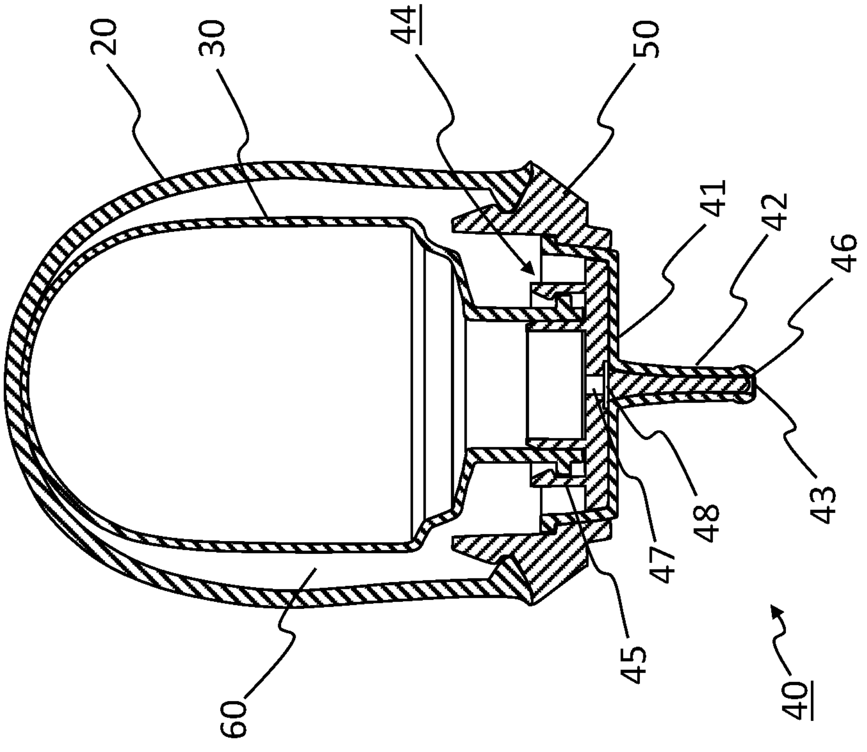
FIG. 3 is a cross-sectional view taken along the line I-I' in FIG. 1(*b*).

FIG. 3 is a cross-sectional view taken along the line I-I' in FIG. 1(*b*). FIG. 3 shows that the cosmetic-liquid supply structure that is composed of the refill 30 and the head-contact part 40 shown in FIG. 2(*a*) and FIG. 2(*b*) is accommodated in the base ring 50 covered by the case 20, and is integrally formed with the main body 10. The bottom of the refill 30, which is shown as the top edge in its inverted posture in FIG. 3, is in contact with the case 20 so as to be held in place by the case 20, and there is a space 60 between the refill 30 and the side wall of the case 20. The role of the space 60 will be described later with reference to FIG. 4(*a*) to FIG. 4(*c*).

The lower-end portion of the inner circumference of the case 20 is provided with a convex engagement portion that engages with the concave engagement portion provided at the upper portion of the outer periphery of the base ring 50, by which the case 20 is connected to the base ring 50 that supports the head-contact part 40. The case 20 is flexible, which allows the case 20 to be detachably engaged with the base ring 50. The base ring 50 includes (1) a concave engagement portion at the upper portion of the outer periphery thereof, (2) at the inner periphery thereof, a stepped portion that supports a flange-shaped projection part located at the upper portion of the outer periphery of the head-contact-part case 41 of the head-contact part 40, and (3) at the lower part of the outer periphery, a stepped portion that corresponds to the inner periphery of the cap 80, by which the base ring 50 is fitted into the cap 80. Thus, the base ring 50 serves as a base, to which each of the components of the cosmetic container that includes a head-massage function 1 is connected or fixed.

The head-contact part 40 includes the head-contact-part case 41 and multiple protrusions 42 integrally formed with the head-contact-part case 41 that protrude downward from the head-contact-part case 41. A through-hole 43 is provided at the axial center of each of the projections 42, with the through-hole 43 passing through each tip of the projections 42 to the head-contact-part case 41.

The head-contact part 40 further includes a head-contact-part-joint member 44 that is provided in the recessed part of the head-contact-part case 41. The head-contact-part-joint member 44 serves as a pedestal to which the refill 30 is attached, and it also forms a flow path for supplying the cosmetic liquid in combination with the head-contact-part case 41. For this purpose, the refill-mounting portion 45 that has a double cylindrical wall is provided to the side of the head-contact-part-joint member 44 that faces the refill 30.

The inner wall of the double cylindrical wall of the refill-mounting portion 45 is configured to closely contact the inner wall of the mouth portion of the refill 30, and the outer wall of the refill-mounting portion 45 is provided with a ring-shaped protrusion on its inner periphery, which engages with a ring-shaped projection provided on the outer periphery of the mouth portion of the refill 30 so that the refill 30 is fixed to the head-contact-part-joint member 44 and will not detach therefrom. That is, the refill 30 is attached to the head-contact-part-joint member 44 in such a way that the mouth portion of the refill 30 is accommodated between the double cylindrical wall of the refill-mounting portion 45 so that the cosmetic liquid inside the refill 30 does not leak out therefrom.

Further, at the center of the head-contact-part-joint member 44 that corresponds to the mouth portion of the refill 30, there is provided a supply hole 47 for supplying a cosmetic liquid, and there is further provided a flow channel 48 that is connected to all the through-holes 43 of the projections 42, so that the flow channel 48 connects the supply hole 47 to the through-holes 43 of the projections 42. The supply hole 47 and the flow channel 48 form the supply path of the cosmetic liquid that passes from the refill 30 to each tip of the projections 42.

The head-contact-part-joint member 44 further includes a projecting core part 46 that is inserted into the through-hole 43 provided to each of the projections 42. The projecting core part 46 has an external shape substantially the same as that of the through-hole 43 of each of the projections 42, and is configured to narrow the supply path of the cosmetic liquid to the gap provided between the inner periphery of the through-hole 43 of each of the projections 42 and the external periphery of the projecting core part 46. Providing the projecting core part 46 to the through-hole 43 for narrowing the supply path prevents the cosmetic liquid from leaking from each of the projections 42.

FIG. 4(*a*) to 4(*c*) is a are drawings that schematically shows how a cosmetic liquid is supplied in the cosmetic container that includes a head-massage function according to the first embodiment of the present invention. FIG. 4(*a*) to 4(*c*) is are also a cross-sectional views taken along the line I-I' of FIG. 1(*b*), as is the case in FIG. 3. FIG. 4(*a*) shows the state in which no external force is applied to the case 20, FIG. 4(*b*) shows the state in which the case 20 is held by a user with a grasping power of less than a fixed level, and FIG. 4(*c*) shows the state in which the case 20 is held by a user with a grasping power of equal to or more than a fixed level.

FIG. 4(*a*) shows the same cross-sectional outline as that shown by the cross-sectional view in FIG. 3, but shows the state where the cosmetic liquid 90 is contained inside the refill 30. In the state where the main body 10 is held in an inverted manner, the cosmetic liquid 90 is supplied to the supply hole 47 and the flow channel 48, both of which are included in the head-contact part 40. The supply path of the cosmetic liquid 90 extends from the flow channel 48 to the through-hole 43 of each of the projections 42, but the gap between the inner wall of each of the projections 42 and the projecting core part 46 is configured to be small, so that the cosmetic liquid 90 does not drip down from the tip of each of the projections 42.

If the case 20 is held by a user with a grasping power of less than a fixed level as is shown in FIG. 4(*b*), that is, in the state where the case 20 is gently grasped by a user, only the case 20 is changed to a shape to fit the user's hand. At this time, although the case 20 is changed, the refill 30 is not changed due to the presence of the space 60, so that the cosmetic liquid 90 cannot be supplied in the state where the case 20 is only gently grasped by the user. Thus, in the state where the cosmetic liquid 90 is not supplied, the user can massage the scalp using the projections 42.

However, when a user supplies the cosmetic liquid 90 to the scalp, or when a user massages the scalp while supplying the cosmetic liquid 90, the user holds the case 20 with a grasping power of equal to or more than a fixed level, in which the case 20 is changed to contact with the refill 30, as shown in FIG. 4(*c*). The refill 30 is changed through the change of the case 20, whereby the cosmetic liquid 90 is supplied in an amount according to the change of the refill 30. Changing the refill 30 to apply pressure to the cosmetic liquid 90 allows the cosmetic liquid 90 to pass through the gap between the inner wall of each of the projections 42 and the projecting core part 46 even if the gap is small, so that the cosmetic liquid 90 can be supplied to the scalp from each tip of the projections 42.

In this manner, when a user holds the case 20, the user can choose whether to supply the cosmetic fluid 90, depending on whether the user applies to the case 20 the power of equal to or more than the level in which the case 20 is changed, by which the case 20 contacts with the refill 30. Also, when the cosmetic liquid 90 is supplied, the amount of the cosmetic liquid 90 that is supplied can be adjusted by the strength of the force by which the user holds the case 20.

Although particular embodiments of the present invention have been described, it will be appreciated by those skilled in the art that changes and modifications may be made thereto without departing from the invention in its broader aspects and as set forth in the appended claims.

DESCRIPTIONS OF REFERENCE NUMBERS

1 cosmetic container that includes a head-massage function
10 main body
20 case
30 refill
40 head-contact part
41 head-contact-part case
42 projection
43 through-hole
44 head-contact-part-joint member
30 45 refill attachment portion
46 projecting core part
47 supply hole
48 flow channel
50 base ring
60 space
70 inner cap
75 dedicated adapter
80 cap
90 cosmetic liquid

The invention claimed is:

1. A cosmetic container that includes a head-massage function, comprising:

a refill for containing a cosmetic liquid;

a head-contact part that is attached to the refill and that comprises multiple projections, the projections being arranged in one or more rows so that the projections disposed on the periphery of the head-contact part are higher than those disposed in the center of the head-contact part to be curved, with each tip of the projections rounded to have a bulging shape;

a case that detachably accommodates the refill, the case being slightly flattened in one direction in a plan view to form a jellyfish shape so as to enable the case's side to be gripped;

an inner cap that accommodates the multiple projections so as to protect them, with the inner cap preventing the cosmetic liquid from leaking out of the projections;

a cap that accommodates the head-contact part and the inner cap so as to protect them, the cap holding in an upright state the refill, the head-contact part, and the case; and a through-hole provided to each of the multiple projections in the axial center thereof, the through-hole serving as a supply path of the cosmetic liquid;

wherein the refill is changed according to a user grasping the case with power equal to or more than a fixed level, whereby the cosmetic liquid is supplied in an amount according to the change of the refill from each tip of the multiple projections; and wherein the refill and the head-contact part integrally form a cosmetic-liquid supply structure, and a refill container is formed by fitting the inner cap into the cosmetic-liquid supply structure, the refill container being used for refilling the cosmetic liquid into the cosmetic container that includes a head-massage function.

2. A cosmetic container that includes a head-massage function according to claim 1, wherein both the case and the refill are composed of a flexible material, there being a space between the refill and the case, and wherein when the case is only gently grasped by a user, only the case is changed to fit to a user's hand, and wherein by applying to the case the power equal to or more than the level by which the case is changed to the extent that the case contacts with the refill, the refill is changed, and the cosmetic liquid is supplied.

3. The cosmetic container that includes a head-massage function according to claim 2, further comprising a dedicated adapter for massaging the scalp, the dedicated adapter being attached to the projections for use with replacing the inner cap in a manner to accommodate the projections to provide softer massage to the scalp, wherein the dedicated adapter for massaging the scalp, being configured to be detachable from the head-contact part, and being composed of a material that is more flexible than the projections of the head-contact part, includes multiple protruding storage portions whose number accords with that of the multiple projections, and wherein each tip of the multiple storage portions, being configured to be round, includes a through-hole at the center of the tip, the through-hole of each tip of the storage portions being communicated with each of the through-holes of the projections.

4. The cosmetic container that includes a head-massage function according to claim 1, further comprising a dedicated adapter for massaging the scalp, the dedicated adapter being attached to the projections for use with replacing the inner cap in a manner to accommodate the projections to provide softer massage to the scalp, wherein the dedicated adapter for massaging the scalp, being configured to be detachable from the head-contact part, and being composed of a material that is more flexible than the projections of the head-contact part, includes multiple protruding storage portions whose number accords with that of the multiple projections, and wherein each tip of the multiple storage portions, being configured to be round, includes a through-hole at the center of the tip, the through-hole of each tip of the storage portions being communicated with each of the through-holes of the projections.

* * * * *